(12) United States Patent
Huang et al.

(10) Patent No.: US 10,860,631 B1
(45) Date of Patent: Dec. 8, 2020

(54) SEARCHING AND SCORING USING PHRASES AND/OR MULTIPLE WORDS

(71) Applicant: INTUIT INC., Mountain View, CA (US)

(72) Inventors: Bei Huang, Mountain View, CA (US); Nhung Ho, Redwood City, CA (US)

(73) Assignee: INTUIT INC., Mountain View, CA (US)

( * ) Notice: Subject to any disclaimer, the term of this patent is extended or adjusted under 35 U.S.C. 154(b) by 210 days.

(21) Appl. No.: 16/014,769

(22) Filed: Jun. 21, 2018

(51) Int. Cl.
*G06F 16/33* (2019.01)
*G06F 16/31* (2019.01)
*G06F 16/338* (2019.01)
*G06F 16/93* (2019.01)

(52) U.S. Cl.
CPC ........ *G06F 16/3334* (2019.01); *G06F 16/313* (2019.01); *G06F 16/338* (2019.01); *G06F 16/3347* (2019.01); *G06F 16/93* (2019.01)

(58) Field of Classification Search
CPC ............. G06F 16/3334; G06F 16/3347; G06F 16/313; G06F 16/338; G06F 16/93
USPC .......................................................... 707/748
See application file for complete search history.

(56) References Cited

U.S. PATENT DOCUMENTS

| 2007/0118506 | A1* | 5/2007 | Kao ...................... G06F 16/345 |
| 2009/0070312 | A1* | 3/2009 | Patterson .............. G06F 16/313 |
| 2011/0137881 | A1* | 6/2011 | Cheng ..................... H04W 4/21 707/706 |
| 2012/0117082 | A1* | 5/2012 | Koperda ............. G06F 16/3331 707/748 |
| 2013/0103696 | A1* | 4/2013 | Wu ................... G06F 16/90324 707/748 |
| 2014/0280088 | A1* | 9/2014 | Speer .................. G06F 16/3347 707/723 |

* cited by examiner

*Primary Examiner* — Evan Aspinwall
(74) *Attorney, Agent, or Firm* — DLA Piper LLP (US)

(57) ABSTRACT

A processor may identify a combination term including at least two individual terms within at least one source of truth stored in a memory in communication with the processor. The processor may identify at least one document including the at least two of the individual search terms. The processor may determine a document weight for the at least one document based on the combination search term and the at least two of the individual search terms within the combination search term. The processor may provide the document as a search result arranged according to the document weight and/or may index the document according to the document weight.

28 Claims, 5 Drawing Sheets

SEARCHING AND SCORING USING PHRASES AND/OR MULTIPLE WORDS

DETAILED DESCRIPTION OF SEVERAL EMBODIMENTS

Embodiments described herein may be configured to search computer-accessible documents, databases, and/or networks. For example, a user may provide a plurality of search terms, and a search system and/or method may return search results responsive to the terms. The disclosed embodiments may consider the phrasing and/or sequence of search terms including a plurality of words to provide results that may be more relevant than results generated by considering the words individually.

In many cases, searches only include a single word or multiple words that are each separate and distinct search terms unto themselves. In these cases, a search system may use any type of search methodology (e.g., Boolean and/or classical set theory), treating each word separately to find relevant results. However, in some cases, search terms may include multiple words. In either case, users may enter multiple words into a dialog box or other user interface (UI) element, and the search system may need to discern whether the multiple words are separate terms or components of one or more multi-word terms.

For example, consider a search term including the city name "Mountain View." A sentence with "mountain" and "view" separately may be very different from a sentence with "Mountain View" together, and the former sentence may not be relevant to the search term. Likewise, the phrase "view mountain" may be irrelevant to a search for "Mountain View." The two words' relationship to one another may be important for searching. In some cases, a subset of words within a phrase may be relevant to a search, but not all words. In other cases, a subset of words within a phrase may be relevant to a search regardless of whether they are next to one another or not. For example, the phrase "state disability insurance tax" may have multiple combinations of relevant search phrases, such as "state tax," "disability insurance," "disability tax," "insurance tax," etc.

Some search systems may use complex machine learning algorithms or other complex processing to analyze search requests including multiple words in order to determine whether they include multi-word terms, potentially incurring time-consuming and/or inefficient computer processing costs. In some embodiments disclosed herein, search systems may employ more efficient processing techniques to identify multi-word terms, such as evaluating search requests against sources of truth as described below (e.g., determining whether the words entered correspond to one or more terms within one or more focused sets of multi-word terms). Accordingly, the disclosed embodiments may accurately identify relevant search results, as opposed to returning less relevant results (e.g., results with "mountain" and "view" far apart from one another, or results with "state" and "disability" but not "insurance" or "tax"), with minimal processing costs and at high speed.

In some embodiments, the search systems and/or methods may be generally applicable to any data source. For example, location names such as "Mountain View" may appear in a variety of different documents from a variety of different sources, and the disclosed techniques may be used to improve searching for any source. In other embodiments, the search systems and/or methods may be customized for specific uses. For example, tax and/or financial terminology may be useful for tax and/or accounting software (e.g., QuickBooks™ Online), and customized search systems and/or methods may be employed for specific use cases such as these.

Figure 1:
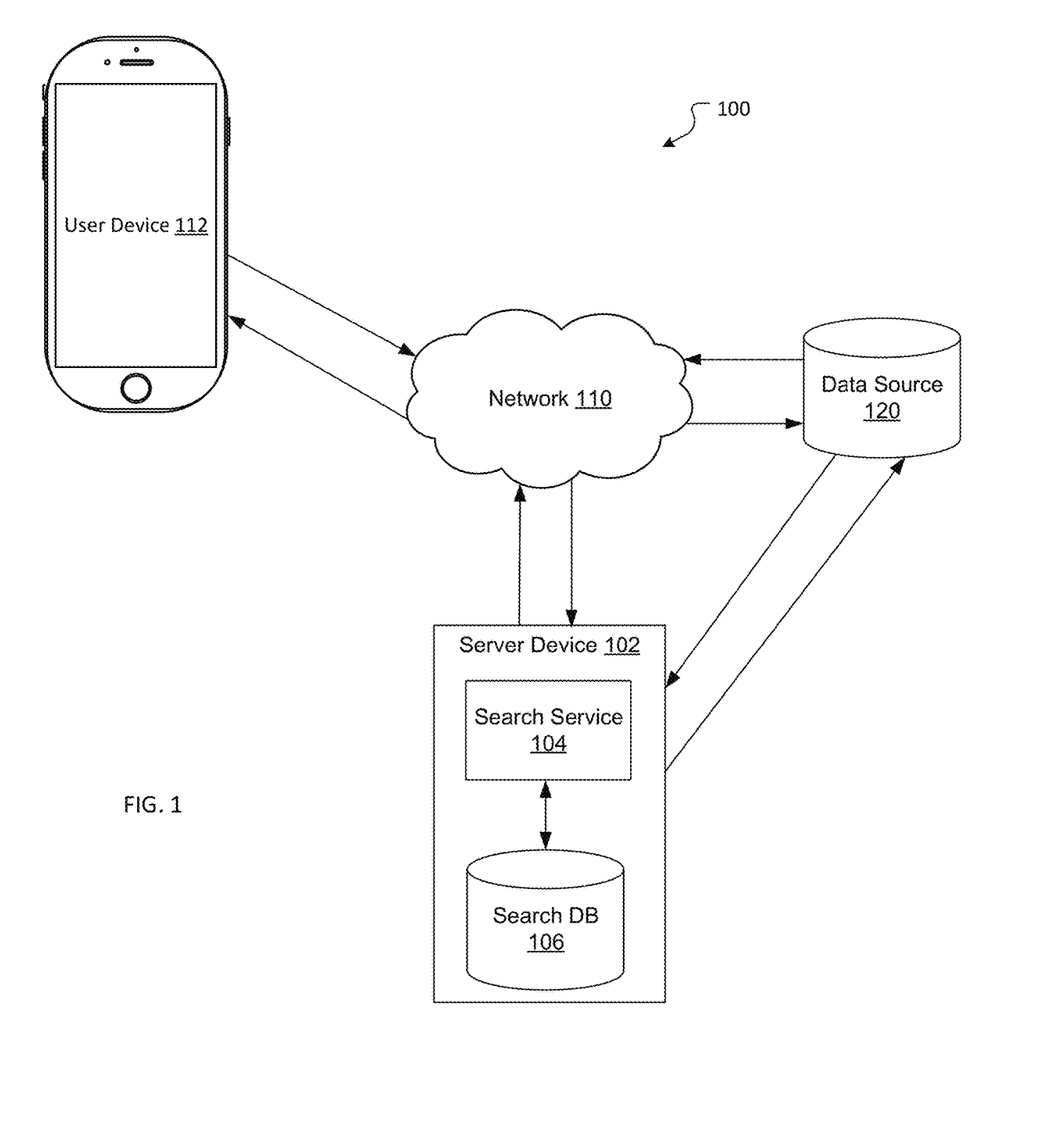
FIG. 1 shows a search system according to an embodiment of the present disclosure.

FIG. 1 shows a system 100 configured to perform keyword-based searching according to an embodiment of the present disclosure. System 100 may include server device 102, which may communicate with user device 112 through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

Server device 102 may be configured to receive search requests from user device 112, determine how to search for relevant results, perform the search and return the results to user device 112. Server device 102 may include search service 104, which may be configured to perform the search-related processing described herein, and search database 106, which may be configured to store relevant terms and/or phrases and, in some embodiments, data to be searched. Detailed examples of the data received, the processing performed, and the results generated are provided below.

User device 112 may be any device configured to present UIs and receive inputs thereto. For example, user device 112 may be a smartphone, personal computer, tablet, laptop computer, or other device. User device 112 may receive user-generated search requests including multiple words through a UI, send the search queries to server device 102, receive search results from server device 102, and display the search results through the UI.

Server device 102 may communicate with one or more data sources 120 through network 100 and/or through local connections to perform the requested searches. While one data source 120 is shown for ease of illustration, server device 102 may communicate with any number of data sources 120. Server device 102 may be configured to formulate queries to data source 120 from the user-generate search requests. As noted above, in some embodiments, server device 102 may search local sources (e.g., search database 106) instead of and/or in addition to data sources 120.

Server device 102 and user device 112 are each depicted as single devices for ease of illustration, but those of ordinary skill in the art will appreciate that server device 102 and/or user device 112 may be embodied in different forms for different implementations. For example, server device 102 and/or user device 112 may include a plurality of servers and/or devices. Alternatively, the operations performed by server device 102 and/or user device 112 may be performed on a single device (e.g., a user may enter requests directly into server device 102 or user device 112 may formulate and respond to the requests). In another example, a plurality of user devices 112 may communicate with server device 102. A single user may have multiple user devices 112, and/or there may be multiple users each having their own user device(s) 112.

Figure 2:
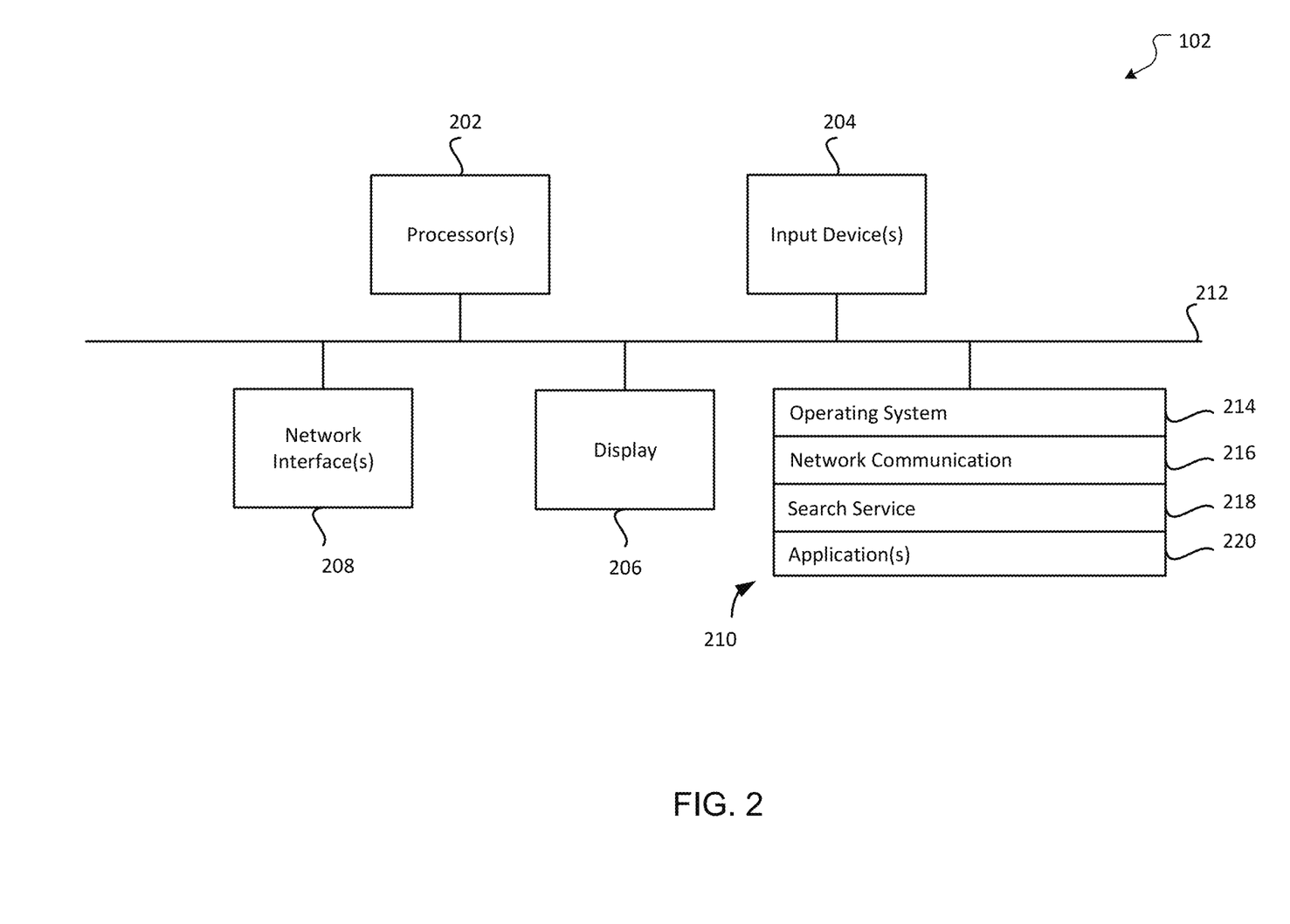
FIG. 2 shows a server according to an embodiment of the present disclosure.

FIG. 2 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Search service instructions 218 may include instructions that determine search terms and/or perform searches as described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
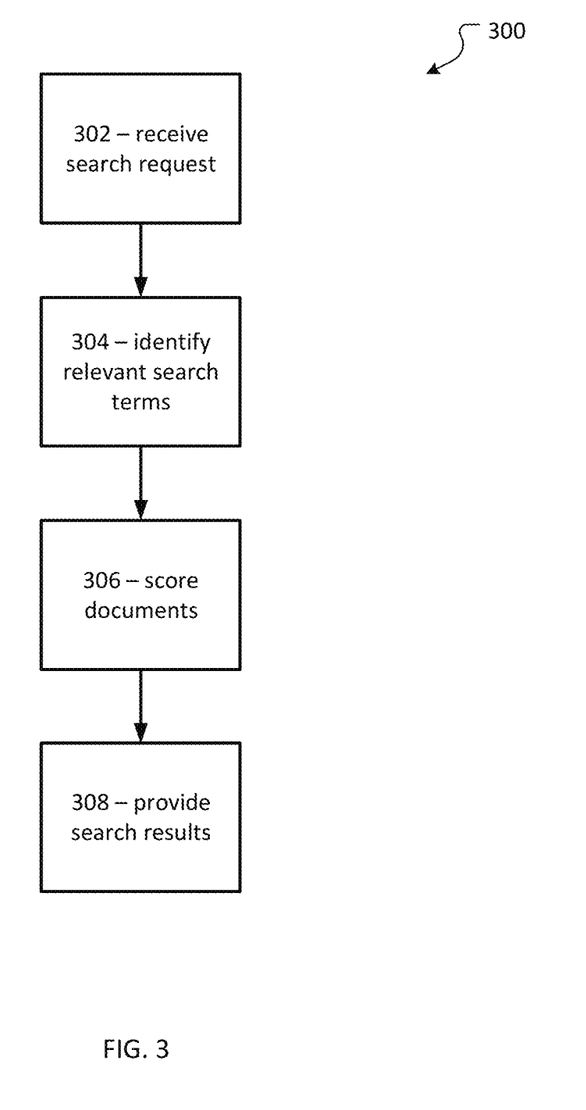
FIG. 3 shows a search process according to an embodiment of the present disclosure.

FIG. 3 shows a search process 300 according to an embodiment of the present disclosure. In the following example, server device 102 may perform process 300 to provide search results in response to search requests received from user device 112. In other embodiments, user device 112 may perform process 300, or server device 102 may perform process 300 for reasons other than responding to requests from user device 112 (e.g., automatically and/or in response to requests from other sources).

At 302, server device 102 may receive a search request. For example, a UI displayed by user device 112 may include a search function. A user may be able to enter search terms into a dialog box to search for matching terms in documents and/or other data sources. User device 112 may send data describing the terms entered into the dialog box to server device 102.

At 304, server device 102 may identify one or more search terms relevant to the search request. For example, the data describing the terms may include a single word or a plurality of words. If the data only includes a single word, search service 104 may use the single word as the relevant search term. However, if the data includes more than one word, search service 104 may perform additional processing in order to determine whether the words are part of a phrase or term or whether they are individual, separate search terms. In some cases, searches with multiple words may not include a phrase or term comprising more than one word. However, in other cases, searches may include multiple words intended to be considered together, such as names or technical terms. Search service 104 may identify such terms or phrases, for example by performing term determination process 400 described below.

At 306, server device 102 may score one or more documents based on their relevance to the identified one or more search terms. For example, search service 104 may identify documents from search database 106 and/or data source(s) 120 that include one or more of the terms. Search service 104 may identify documents including each word separately and/or documents including the identified phrases and/or multi-word terms from 204, for example performing a search based on Boolean and/or classical set theory. Search service 104 may apply one or more scoring algorithms to determine each document's relevance to the search request. For example, search service 104 may use an Apache Lucene™ scoring method and/or a modified version thereof in some embodiments. In some embodiments, search service 104 may perform the document identification and scoring according to search scoring process 500 described below.

At 308, server device 102 may provide search results based on document scores. For example, search service 104 may provide data enabling user device 112 to display a list of search results (e.g., links to documents and/or the documents themselves). The search results may be presented in order of relevance to the search request and/or may be presented with information communicating their relevance to the search request (e.g., a score). User device 112 may display the results in a UI, and may allow the user to select results for viewing, download, and/or other access.

Figure 4:
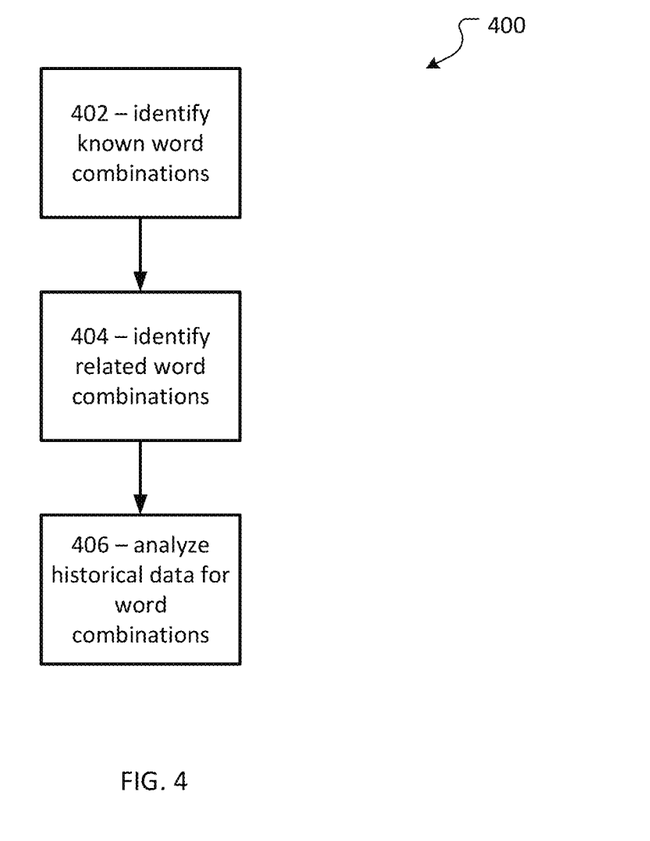
FIG. 4 shows a search term determination process according to an embodiment of the present disclosure.

FIG. 4 shows a search term determination process 400 according to an embodiment of the present disclosure. For example, server device 102 (or another device performing search process 300) may perform search term determination process 400 in order to identify terms relevant to a requested search during search process 300 at 304. Search term determination process 400 may use one or more sources of truth to identify word combinations that together may form one or more distinct search terms (e.g., "combination search terms" or "multi-word search terms"). For example, the one or more sources of truth may be sets of data in search database 106 defining multi-word search terms and, in some cases, may define terms relevant to a specific use (e.g., terms related to accounting, finance, or other specific fields of knowledge). Search term determination process 400 is presented as a complete process wherein multiple methods are used to identify terms. However, in some embodiments, server device 102 may perform a subset of process 400 to identify combination search terms, and/or some of the elements of process 400 may be optional.

At 402, server device 102 may determine whether the search request includes any known word combinations. For example, search database 106 may include a source of truth defining a set of known word combinations. Search service 104 may compare the terms in the search request with the terms in search database 106 to determine whether any of them are known terms. For example, if the search request includes "Mountain View," search service 104 may identify the term "Mountain View" in a list of US cities stored in search database 106. In another example, if the search request includes "insurance tax," search service 104 may identify the term "insurance tax" in a dictionary of tax terms stored in search database 106. If search service 104 identifies any combination of words in the search request in search database 106, search service 104 may consider the identified combination as a single combination search term for searching (e.g., for performing document identification and scoring in process 300 at 306). Because search service 104 has access to the source of truth in search database 106, search service 104 may identify the terms quickly through a lookup rather than by performing costly machine learning or algorithmic phrase analysis.

In some embodiments, the known word combinations in the source of truth in search database 106 may be generally useful word combinations, such as location names, names of famous people, names of common items or products, and/or other word combinations. In some embodiments, the known word combinations may be tailored to specific use cases. For example, search service 104 may be configured for use with one or more specific apps or software products or product types. If search service 104 is configured for use with tax preparation software, search database 106 may include a set of tax-related word combinations (e.g., phrases and/or terms from tax dictionaries, tax laws, tax regulations, and/or other related sources). Likewise, if search service 104 is configured for use with accounting software, search database 106 may include a set of accounting-related word combinations (e.g., phrases and/or terms from accounting dictionaries, finance laws, finance regulations, and/or other related sources). In some embodiments, search database 106 may include a set of terms generated by a machine learning algorithm, such as a set of topic names generated by analyzing groups of terms (e.g., as described in U.S. patent application Ser. No. 15/946,400, which is incorporated by reference in its entirety herein). In some embodiments, search database 106 may store a customized set of word combinations created by a user and/or tailored for a specific use.

In some embodiments, search service 104 may require an exact match (e.g., each word in order) or other types of matches, and the requirement may be set on a phrase-by-phrase basis and/or as a general or default requirement.

Other types of matches may include finding each word in the phrase within a window of words greater in size than the phrase (e.g., two words in any order within a five-word window) and/or each word next to each other but not necessarily in order. For example, "Mountain View" may require an exact match because "view mountain" may have a different meaning, "George Washington" and "Washington, George" may be considered the same despite the different word orders, and "insurance tax" may be subject to a window requirement so that phrases such as "tax in California for insurance" may be considered a match. Using a window may provide flexibility for phrase identification while not adding significantly to the processing complexity, because similar lookup-type processing (e.g., as opposed to machine learning) may be applied.

At 404, server device 102 may determine whether data associated with the request is indicative of any word combinations. Data associated with the request may include data received by server device 102 in addition to the actual search terms entered by the user. Server device 102 may use this data to identify word combinations for searching.

For example, search service 104 may be configured to evaluate the search request to determine a geographic location of origin (e.g., based on IP address) and/or may receive geographic data encoded in the request (e.g., Global Positioning System (GPS) location of user device 112 encoded in the request). In this example, search service 104 may use the user's location as a search term. If the location is a single word, search service 104 may add this word to the other words in the search request. However, if the location includes multiple words, search service 104 may generate a word combination as a single combination search term (e.g., "Mountain View" for an IP address located in Mountain View, Calif.).

In another example, the search request may include information indicating a user preference for handling the request. For example, the UI may include an option for requiring an exact match of an entire phrase entered into the dialog box, and/or the UI may include an option for forming phrases (e.g., placing quotation marks around a set of words). User device 112 may include data indicating the user's preference. Search service 104 may form phrases to use as combination search terms as indicated by the user's preference. For example, for an exact match, search service 104 may form a search term from the entire phrase entered. For a requested phrase, search service 104 may form a search term from the requested phrase (e.g., from the words in quotation marks).

At 406, server device 102 may use historical search data as at least part of the source of truth to determine whether the search request includes any word combinations. For example, search service 104 may generate a record of past search requests entered by the current user and/or by other users of the software with which the search UI is associated. Search service 104 may store this record in search database 106. Search service 104 may analyze the record to identify words that frequently appear together in searches and generate combination search terms based on the identifying. In some embodiments, search service 104 may analyze the record to generate a set of frequently observed combination search terms prior to receiving the search request and store the set of frequently observed combination search terms in search database 106. Accordingly, when search service 104 receives a search request, search service 104 may match terms in the request to the frequently observed combination search terms in search database 106 in a similar fashion to the matching performed at 402.

For example, search service 104 may analyze past search requests by tokenizing each word in each search request. Search service 104 may assign like words in different search requests with like tokens. Search service 104 may identify tokens that appear close to one another frequently across the record of past search requests. For example, the terms "401" and "K" may frequently appear next to one another in searches related to tax and/or accounting applications, and search service 104 may observe the tokens for these terms next to one another in many searches. Search service 104 may also determine a rarity of each token within the record. For example, the term "the" may be very common in searches, and search service 104 may observe the token for this term frequently in searches and in a variety of contexts (e.g., not necessarily near any other specific tokens more frequently than others). Based on these two types of observations, search service 104 may determine whether two tokens are related. For example, if two or more tokens always, or nearly always, appear together, and the two tokens are not especially common, search service 104 may determine that the associated words are likely to be a phrase. For example, "401" and "K" may be infrequently-encountered terms, so "401 K" may be stored as a phrase in search database 106. However, "the 401 K" may not be stored as a phrase, because "the" may be encountered frequently enough in other contexts to not necessarily be an essential part of the phrase.

As in 402, in some embodiments, search service 104 may require an exact match (e.g., each word in order) or other types of matches, and the requirement may be set on a phrase-by-phrase basis and/or as a general or default requirement. Other types of matches may include finding each word in the phrase within a window of words greater in size than the phrase (e.g., two words in any order within a five-word window) and/or each word next to each other but not necessarily in order. For example, "Mountain View" may require an exact match because "view mountain" may have a different meaning, "George Washington" and "Washington, George" may be considered the same despite the different word orders, and "insurance tax" may be subject to a window requirement so that phrases such as "tax in California for insurance" may be considered a match.

Figure 5:
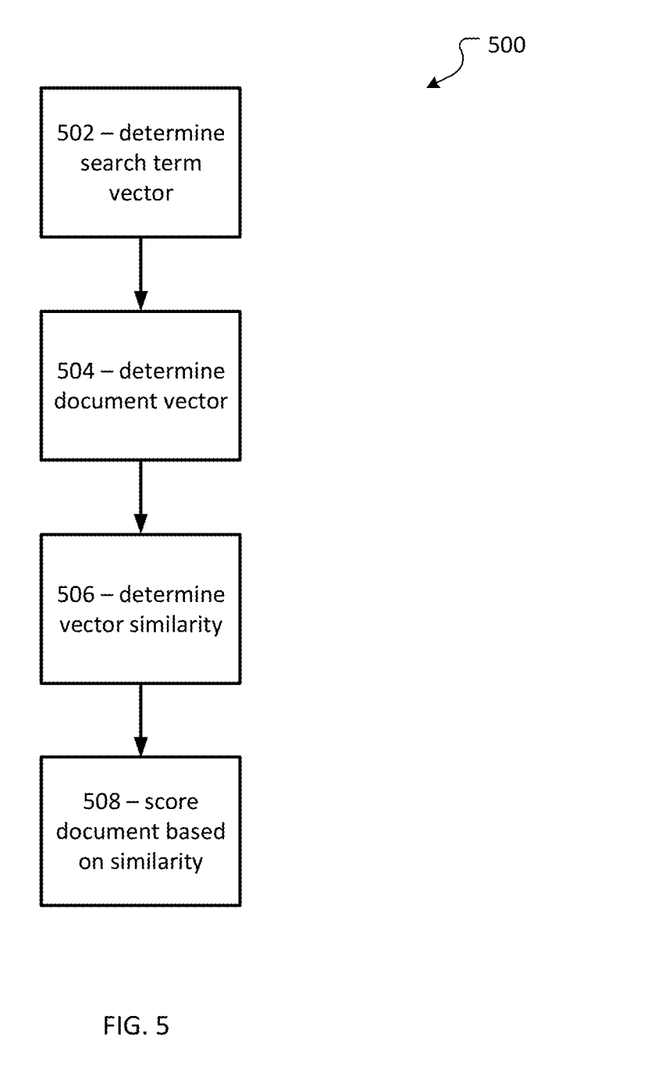
FIG. 5 shows a search scoring process according to an embodiment of the present disclosure.

FIG. 5 shows a search scoring process 500 according to an embodiment of the present disclosure. For example, server device 102 (or another device performing search process 300) may perform scoring process 500 in order to identify search results relevant to a requested search during search process 300 at 306. In some embodiments, scoring process 500 may use one or more algorithms similar to those employed in the Apache Lucene™ scoring system, although other embodiments may use different scoring methodologies. In some embodiments, the algorithms used may improve upon standard Apache Lucene™ scoring by virtue of incorporating multi-word terms and individual terms into the scoring (e.g., being able to score multi-word matches differently from single-word matches as described below). Scoring process 500 is described with respect to scoring a single document, although server device 102 may perform scoring process 500 a plurality of times to score a plurality of documents during search process 300 at 306, in order to generate a ranked set of documents as search results during search process 300 at 308, for example.

At 502, server device 102 may determine a weighted vector for a search term. For example, search service 104 may determine how frequently the search term appears in searches of the entire data set being searched (e.g., within data source(s) 120) or a source of truth data set (e.g., within search database 106 dictionaries or prior search results described above) when a search based on Boolean and/or classical set theory is run. The term's frequency of appearance in the data set may be the "term frequency." A lower term frequency may indicate a more unique term having a greater rarity as compared with a high-frequency term which appears often. Search service 104 may also determine how frequently the term appears within one or more individual documents in which it is found, on average. The term's average frequency count within documents may be the "document frequency." A higher document frequency may indicate a more important term to the meaning of the document as compared with a low-frequency term within the document. Search service 104 may determine a document weight V(d) for the vector as the term frequency times the inverse of the document frequency for the document. Search service 104 may therefore give the highest weights to terms that appear at a low frequency within the overall data set, but at a high frequency within documents in which they do occur. Search service 104 may generate a vector V(q) for the term and weigh the vector by the weight. In some embodiments, search service 104 may determine the weighted vector V(q) (e.g., the "term weight") for a term prior to receiving a request for the term and store the weighted vector V(q) for the term in search database 106, so that the term weight is precalculated when a search request is received. In some embodiments, search service 104 may pre-index (pre-calculate) term-frequency and inverse-document-frequency for both single terms and known multi-word terms. The pre-indexing may allow much faster calculation in real-time search implementations compared to systems that do not pre-index known terms. For example, the well-known Apache Lucene™ ElasticSearch only indexes the single terms, so indexing multi-word terms may result in less latency in real-time.

In some embodiments, search service 104 may generate multiple weighted vectors that may be relevant to a single search term. For example, when the order and position of words within a term must be exact (e.g., "Mountain View"), there may be only one vector (e.g., the vector for "Mountain View"). However, when the order and position of words within a term need not be exact, multiple weighted vectors may apply, and each vector may have a different weight. For example, "George Washington" may appear more frequency in the data set than "Washington, George," and may therefore have a different weight. Likewise, a five-word window in which the words "insurance" and "tax" may appear may have a different frequency, and therefore weight, than a three-word window for the same words. In some embodiments, search service 104 may apply only a single window size (e.g., X words) to all searches in order to avoid having to calculate multiple weights. The window size may be tuned to balance finding more search results (larger window) with processing speed and relevance (smaller window). In the event of multiple vectors applying to a search term, server device 102 may perform subsequent processing at 504-508 for each vector.

At 504, server device 102 may determine a weighted vector for the search term within the document. As with the vector for the term, the document weight for the document may be the term frequency times the inverse of the document frequency for the particular document. For example, search service 104 may take the term's term frequency from 502 as the term frequency. Search service 104 may determine the term's frequency of appearance within the document being analyzed as the document frequency. Search service 104 may therefore give the highest document weights to documents that include high frequencies of terms appearing at a low overall frequency (and having a high rarity) within the overall data set. Search service 104 may generate a weighted vector V(q) for the term and weigh the vector by the document weight.

At 506, server device 102 may determine a similarity between a weighted vector V(q) indicative of the term weight and the document vector V(d) indicative of the document weight. For example, search service 104 may determine a cosine similarity between V(q) and V(d) as follows:

$$\text{cosine-similarity}(q,d) = (V(q)*V(d))/(|V(q)|*|V(d)|)$$

At 508, server device 102 may score the document based on the similarity. For example, search service 104 may score documents according to cosine similarity times term weight. The cosine similarity may indicate how relevant the term itself is to the document. As a consequence of the weighing, the appearance of more unique or rarer (e.g., highly-scored) terms within a document may enhance the document's relevance. Documents above a predetermined score threshold may be considered relevant to the search request.

In some embodiments, the document's score may be based on a combination (e.g., a sum) of cosine similarity times term weight for a plurality of terms. For example, if the search request is for "Mountain View," search service 104 may determine a score for each of "mountain," "view," and "Mountain View," and take a combined score from each vector as the total document relevance score. Thus, a document that includes the phrase "there is a great view from the top of the mountain" may be relevant for including "mountain" and "view," but may be less relevant than a document that includes the phrase "Mountain View is a city," which includes "mountain," "view," and "Mountain View" vectors. Likewise, if the set of vectors includes an exact match vector for a two-word phrase, a window vector including the two words, and two individual word vectors, a document with the exact match of the phrase will have all four vectors and may score higher than a document with the two words within the window (three vectors only), which in turn may score higher than a document with the two words, but outside the window (two vectors only).

Search service 104 may provide scores for a plurality of scored documents to user device 112 for presentation to the user through the UI. For example, user device 112 may provide a list of documents arranged from highest-scoring relevant document to lowest-scoring relevant document.

The specific weighing and similarity methodologies described above are presented as examples only. In some embodiments, different weighing and/or similarity methodologies may be used. For example, search service 104 may use any weighing methodology that allows multi-word phrases to be considered more relevant than windowed word sets, which in turn may be considered to be more relevant than individual words. Likewise, search service 104 may use any similarity determination methodologies to determine how similar a phrase or window within a document is to a search phrase or window.

In some embodiments, in addition to or instead of providing search results, the above methods may be used to index documents. For example, search service 104 may apply scoring process 500 to a document using a set of known word combinations (e.g., as described above with respect to 402) as search inputs. The scoring results generated at 508 may include a score of the document's relevance to each term in the set of known word combinations. Accordingly, the scoring results may provide an index of the document dictated by the set of known word combinations. For example, the document may be indexed to a specialized set of terms (e.g., the tax dictionary or accounting dictionary described above).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a server computing device for searching for relevant documents, the server computing device comprising a processor and a memory, the memory storing executable instructions that when executed by the processor cause the server computing device to perform:

receiving, through a network and from a user device operated by a user, a search request including a plurality of individual search terms;

identifying, by accessing a database in communication with the processor and based on the search request, a combination search term within at least one source of truth stored in the database, the combination search term indicative of an observed word combination including at least two of the individual search terms;

searching, through the network, at least one data source to identify a plurality of documents including the at least two of the individual search terms;

determining a document weight for each of the plurality of the identified documents for each of the combination search term and the at least two of the individual search terms within the combination search term;

executing a scoring algorithm for each of the plurality of the identified documents by:

calculating respective similarity values between each respective document weight for each document and each of the set of the term weights, the set of the term weights comprising a combination search term weight and respective term weights of the at least two of the individual search terms, and determining a document score relevant to each of the combination search term and the at least two of the individual search terms, a document score being a sum of each of the respective similarity values multiplied by each of the set of the term weights; and providing to the user device for a presentation to the user through a user interface, at least one of the plurality of documents as a search result responsive to the search request, wherein the at least one of the plurality of documents is arranged in the search result according to the document score of the at least one of the plurality of documents.

2. The method of claim 1, wherein identifying the combination search term comprises:

identifying the at least two of the individual search terms within the at least one source of truth; and determining a term weight from the set of term weights for a combination of identified at least two of the individual search terms relative to the at least one source of truth.

3. The method of claim 1, wherein the at least one source of truth includes a predefined set of relevant terms as a plurality of observed word combinations of the search terms.

4. The method of claim 3, further comprising:

analyzing a plurality of previous search requests to identify at least two individual search terms that frequently appear in combination; and adding, to the database, the at least two individual search terms to the predefined set of relevant terms as a single combination search term.

5. The method of claim 1, wherein the at least one source of truth includes location data encoded in the search request, and said method further comprises: adding a location name associated with the location data as an individual search term or a combination search term to the search request, the location data being based on a Global Positioning System (GPS) location of the user device when the user sends the search request.

6. The method of claim 1, wherein determining each respective document weight for the document with each respective search term includes determining a value of a frequency count of the search term within the document multiplied by an inverse of an average frequency count of the search term within the plurality of the identified documents, each respective search term being one of the search term combination and the at least two of the individual search terms within the combination search term.

7. The method of claim 1, wherein the combination search term weight and the respective weights of the at least two of the individual search terms are predefined and stored in the database.

8. The method of claim 1, wherein the combination search term includes an exact arrangement of the at least two of the individual search terms.

9. The method of claim 1, wherein the combination search term includes an arrangement of the at least two of the individual search terms within a window of words larger than the at least two of the individual search terms.

10. A method implemented by a server computing device for indexing documents, the server computing device comprising a processor and a memory, the memory storing executable instructions that when executed by the processor to cause the server computing device to perform:

receiving a document and a combination indexing term as search inputs;

identifying, by accessing a database in communication with the processor, the combination indexing term within at least one source of truth stored in the database, the combination indexing term indicative of an observed word combination including at least two of the individual indexing terms;

determining a document weight for the document for each of the combination indexing term and the at least two of the individual indexing terms within the combination indexing term;

executing a scoring algorithm for each of the plurality of the identified documents by:

calculating the respective similarity values between each respective document weight for the document and each of the set of the indexing term weights, the set of the indexing term weights comprising a combination indexing term weight and respective term weights of the at least two of the individual indexing terms, and determining the document score to be a sum of each of the respective similarity values multiplied by each of the set of the indexing term weights; and indexing the document to the combination indexing term, wherein a relevance of the document to the combination indexing term is indicated according to the document score of the document.

11. The method of claim 10, wherein identifying the combination indexing term comprises determining a indexing term weight from the set of indexing term weights for a combination of the at least two of the individual indexing terms relative to the at least one source of truth.

12. The method of claim 10, wherein the at least one source of truth includes a predefined set of relevant terms as a plurality of observed word combinations of the indexing terms.

13. The method of claim 12, further comprising:

analyzing a plurality of previous search requests to identify at least two individual indexing terms that frequently appear in combination; and adding the at least two individual indexing terms to the predefined set of relevant terms as a single combination indexing term.

14. The method of claim 10, wherein determining the document weight includes determining a value of a frequency count of the indexing term within the document multiplied by an inverse of an average frequency count of the indexing term within the document, the each respective indexing term being one of the indexing combination term and the at least two of the individual indexing terms within the combination indexing term.

15. The method of claim 10, wherein the combination indexing term weight and the respective weights of the at least two of the individual indexing terms are predefined and stored in the database.

16. The method of claim 10, wherein the combination indexing term includes an exact arrangement of the at least two of the individual indexing terms.

17. The method of claim 10, wherein the combination indexing term includes an arrangement of the at least two of the individual indexing terms within a window of words larger than the at least two of the individual indexing terms.

18. A document search system comprising:

a database configured to store at least one source of truth; and a server computing device comprising: a processor in communication with the database through a network and a memory, the memory storing executable instructions that when executed by the processor cause the server computing device to:

receive, through the network and from a user device operated by a user, a search request including a plurality of individual search terms;

identify, by accessing the database, a combination search term within the at least one source of truth in the database, the combination search term indicative of an observed word combination including at least two of the individual search terms;

search, through the network, at least one data source to identify a plurality of documents including the at least two of the individual search terms;

determine a document weight for each of the plurality of the identified documents for each of the combination search term and the at least two of the individual search terms within the combination search term;

execute a scoring algorithm for each of the plurality of the identified documents by:

calculating the respective similarity values between each respective document weight for each document and each of the set of the term weights, the set of the term weights comprising a combination search term weight and respective term weights of the at least two of the individual search terms, and determining the document score to be a sum of each of the respective similarity values multiplied by each of the set of the term weights; and provide, to the user device for a presentation to the user through a user interface, at least one of the plurality of documents as a search result responsive to the search request, wherein the at least one of the plurality of documents is arranged in the search result according to the document score of the at least one of the plurality of documents.

19. The system of claim 18, wherein the the executable instructions are further executed by the processor to cause the server computing device to identify the combination search term by:

identifying the at least two of the individual search terms within the at least one source of truth; and determining a term weight from the set of term weights for a combination of identified at least two of the individual search terms relative to the at least one source of truth.

20. The system of claim 18, wherein the at least one source of truth includes a predefined set of relevant terms as a plurality of observed word combinations of the search terms.

21. The system of claim 20, wherein the executable instructions are further executed by the processor to cause the server computing device to:

analyze a plurality of previous search requests to identify at least two individual search terms that frequently appear in combination; and add, to the database, the at least two individual search terms to the predefined set of relevant terms as a single combination search term.

22. The system of claim 18, wherein the executable instructions are further executed by the processor to cause the server computing device to add location data encoded in the search request to the at least one source of truth as an individual search term or a combination search term in the search request, the location data being based on a Global Positioning System (GPS) location of the user device when the user sends the search request.

23. The system of claim 18, wherein the executable instructions are further executed by the processor to cause the server computing device to determine the document weight for a document with each respective search term by determining a value of a frequency count of the search term within the document multiplied by an inverse of an average frequency count of the search term within the plurality of the identified documents, the each respective search term being one of the search term combination and the at least two of the individual search terms within the combination search term.

24. The system of claim 18, wherein the combination search term weight and the respective weights of the at least two of the individual search terms are predefined and stored in the database.

25. The system of claim 18, wherein the combination search term includes an exact arrangement of the at least two of the individual search terms.

26. The system of claim 18, wherein the combination search term includes an arrangement of the at least two of the individual search terms within a window of words larger than the at least two of the individual search terms.

27. The system of claim 18, wherein the processor is in communication with the at least one data source through the network.

28. The system of claim 18, wherein the executable instructions are further executed by the processor to cause the server computing device to:
   receive the search request from a user device through a network; and
   provide the search results to the user device through the network.

* * * * *